(12) United States Patent
Glover et al.

(10) Patent No.: US 11,686,826 B2
(45) Date of Patent: Jun. 27, 2023

(54) MEASURING TIME-OF-FLIGHT USING A PLURALITY OF DETECTOR SUBSYSTEMS AND HISTOGRAM STORAGE

(71) Applicant: ams AG, Premstaetten (AT)

(72) Inventors: Kerry Glover, Premstaetten (AT);
Manfred Lueger, Premstaetten (AT);
Robert Kappel, Premstaetten (AT);
Christian Mautner, Premstaetten (AT);
Mario Manninger, Premstaetten (AT);
Georg Roehrer, Premstaetten (AT)

(73) Assignee: AMS AG, Premstaetten (AT)

( * ) Notice: Subject to any disclaimer, the term of this patent is extended or adjusted under 35 U.S.C. 154(b) by 445 days.

(21) Appl. No.: 16/649,223

(22) PCT Filed: Sep. 21, 2018

(86) PCT No.: PCT/EP2018/075612
§ 371 (c)(1),
(2) Date: Mar. 20, 2020

(87) PCT Pub. No.: WO2019/057898
PCT Pub. Date: Mar. 28, 2019

(65) Prior Publication Data
US 2020/0300989 A1    Sep. 24, 2020

Related U.S. Application Data

(60) Provisional application No. 62/562,321, filed on Sep. 22, 2017.

(30) Foreign Application Priority Data

Oct. 26, 2017  (EP) .................................. 17198603

(51) Int. Cl.
*G01S 7/4865* (2020.01)
*G01S 7/481* (2006.01)
(Continued)

(52) U.S. Cl.
CPC .......... *G01S 7/4865* (2013.01); *G01S 7/4813* (2013.01); *G01S 7/4863* (2013.01); *G01S 17/10* (2013.01); *G02B 7/40* (2013.01); *G04F 10/005* (2013.01)

(58) Field of Classification Search
CPC .... G01S 7/4865; G01S 7/4813; G01S 7/4863; G01S 17/10; G01S 7/486; G01S 7/4816;
(Continued)

(56) References Cited

U.S. PATENT DOCUMENTS 9,006,641 B2    4/2015  Drader
2011/0248875 A1*  10/2011  Holcombe ............ G01S 3/7803
                                                  341/143

(Continued)

FOREIGN PATENT DOCUMENTS

CN  103969222 A    8/2014
CN  106124471       11/2016
(Continued)

OTHER PUBLICATIONS

Japanese Office Action (with English Summary) dated Apr. 27, 2021 for corresponding Japanese Application No. 2020-515964, (Examiner Unknown), 5 pages.
(Continued)

*Primary Examiner* — Jennifer D Bennett
*Assistant Examiner* — Erin R Garber
(74) *Attorney, Agent, or Firm* — MH2 Technology Law Group LLP

(57) ABSTRACT

A semiconductor body includes a driver for driving a light source, at least two detectors each including an avalanche diode, a time-to-digital converter arrangement coupled to outputs of the at least two detectors, a memory that is coupled to the time-to-digital converter arrangement and is
(Continued)

configured to store at least one histogram, and an evaluation unit coupled to the driver and to the memory.

15 Claims, 5 Drawing Sheets

(51) Int. Cl.
*G01S 7/4863* (2020.01)
*G02B 7/40* (2021.01)
*G01S 17/10* (2020.01)
*G04F 10/00* (2006.01)

(58) Field of Classification Search
CPC ....... G04F 10/005; G02B 7/40; H01L 31/107; H01L 31/02027; G01J 2001/4466; G01J 1/44; G01J 1/4228; G01J 2001/448; G01J 2001/442
See application file for complete search history.

(56) References Cited

U.S. PATENT DOCUMENTS

| | | | |
|---|---|---|---|
| 2012/0075615 A1 | 3/2012 | Niclass et al. | |
| 2012/0076361 A1* | 3/2012 | Fujiyoshi | G06V 40/103 382/103 |
| 2015/0370223 A1* | 12/2015 | Mann | H03M 1/0617 250/336.1 |
| 2016/0033644 A1 | 2/2016 | Moore | |
| 2017/0052065 A1* | 2/2017 | Sharma | G01S 17/894 |
| 2017/0134710 A1* | 5/2017 | Wang | H04N 5/3765 |
| 2017/0207073 A1* | 7/2017 | Wildgoose | H01J 49/02 |
| 2018/0006182 A1* | 1/2018 | Renard | G01S 7/4813 |
| 2021/0149028 A1* | 5/2021 | Gong | G01S 17/10 |

FOREIGN PATENT DOCUMENTS

| | | |
|---|---|---|
| EP | 3182156 | 6/2017 |
| EP | 3206234 | 8/2017 |
| EP | 3239788 | 11/2017 |
| EP | 3255456 | 12/2017 |
| EP | 3261134 | 12/2017 |
| EP | 3264544 | 1/2018 |
| EP | 3285087 | 2/2018 |
| EP | 3290950 | 3/2018 |
| EP | 3339985 | 6/2018 |
| EP | 3355133 | 8/2018 |
| EP | 3355459 | 8/2018 |
| EP | 3419168 | 12/2018 |
| EP | 3435422 | 1/2019 |
| JP | H7333339 A | 12/1995 |
| JP | 2010091377 A | 4/2010 |
| JP | 2011171715 A | 9/2011 |
| JP | 2017022490 A | 1/2017 |
| WO | 2007004606 A1 | 1/2007 |
| WO | 2017094279 A1 | 6/2017 |

OTHER PUBLICATIONS

Korean Office Action (with English Translation) in corresponding KR Application 10-2020-7007842 dated Sep. 1, 2021, 26 pages.
European Patent Office, International Search Report for PCT/EP2018/075612 dated Dec. 17, 2018.
Acam datasheet "TDC-GPX Ultra-high Performance 8 Channel Time-to-digital Converter", Jan. 8, 2007.
Ams datasheet "TDC-GPX2; 4-Channel Time-to-Digital Converter" V1-01; Oct. 28, 2016.
Korean Notice of Allowance dated Jan. 26, 2023, KR Application No. 20207007842, 5 pages (including English translation).
Chinese Office Action dated Feb. 6, 2023, CN Application No. 2018800611707, 13 pages (including English translation).

* cited by examiner

MEASURING TIME-OF-FLIGHT USING A PLURALITY OF DETECTOR SUBSYSTEMS AND HISTOGRAM STORAGE

CROSS-REFERENCE TO RELATED APPLICATIONS

The present application is the national stage entry of International Patent Application No. PCT/EP2018/075612, filed on Sep. 21, 2018, which claims the benefit of priority of European Patent Application No. 17198603.7, filed on Oct. 26, 2017 and U.S. Provisional Application No. 62/562,321 filed on Sep. 22, 2017, all of which are hereby incorporated by reference in their entirety for all purposes.

FIELD

The present disclosure is related to a semiconductor body, a time-of-flight sensor and a method for a time-of-flight measurement.

BACKGROUND OF THE INVENTION

The present disclosure is related to the field of time-of-flight measurement devices. These devices send out a light pulse and measure the time it takes until the reflected light has reached the detector circuits of the device.

SUMMARY OF THE INVENTION

The definitions as described above also apply to the following description unless otherwise stated.

In an embodiment, a semiconductor body comprises a driver for driving a light source, at least two detectors each comprising at least one avalanche diode, a time-to-digital converter arrangement coupled to outputs of the at least two detectors, a memory that is coupled to the time-to-digital converter arrangement and is configured to store at least one histogram, and an evaluation unit coupled to the driver and to the memory.

Advantageously, a histogram is generated such that at least two targets or objects can be detected.

In an embodiment, the at least one histogram comprises the information received by one detector of the at least two detectors. A further histogram may comprise the information received by the other detector of the at least two detectors.

Each detector may comprise an avalanche diode or an avalanche diode array. The avalanche diode array comprises more than one avalanche diode.

In an embodiment, the semiconductor body comprises at least three detectors, at least four detectors or at least five detectors. An output of each detector may be coupled to the time-to-digital converter arrangement.

In an embodiment, the memory is split into several memories, memory parts or memory areas.

In an embodiment, the at least two detectors are implemented as a first to a fourth detector. The first to the fourth detector may be arranged in a square or a stripe or two stripes. The first to the fourth detector may be located on the four corners of a square or rectangle. The first to the fourth detector may be located on a straight line, optionally with equal distances. Arranging the detectors in a square or stripe allows for using a parallax effect to extend the measurement range to small distances. For example, the detectors can be arranged along stripes which define a direction perpendicular to the direction defined by the connecting line between the light source and the detectors.

In an embodiment, the first to the fourth detector, the time-to-digital converter arrangement and the memory are configured to generate and store histograms of four different regions of an image. The four regions may be four quadrants of an image or four regions that are linearly arranged on an axis.

In an embodiment, the time-to-digital converter arrangement comprises at least one time-to-digital converter, at least two time-to-digital converters, at least three time-to-digital converters or at least four time-to-digital converters. Time-to-digital can be abbreviated TD. The number of detectors may be equal or higher than the number of TD converters.

In an embodiment, the time-to-digital converter arrangement comprises a first to a fourth time-to-digital converter, abbreviated TD converter or TDC, coupled to the first to the fourth detector and to the memory. Thus, a first TD converter couples the first detector to the memory and generates a first histogram. Correspondingly, a second to a fourth TD converter couples the second to the fourth detector to the memory and generates a second to a fourth histogram.

In an embodiment, at least one of the first to the fourth time-to-digital converter comprises a ring oscillator having an input coupled to the detector, a counter coupled to an output of the ring oscillator, and a transfer circuit. The transfer circuit is coupled to the ring oscillator, the counter and the memory. The transfer circuit may be configured to capture the current state of the ring oscillator and the counter, to decode the captured state into a time stamp and to transfer data into the memory as a function of the time stamp. In an example, each of the first to the fourth time-to-digital converter comprises a ring oscillator, a counter and a transfer circuit as described above.

In an embodiment, one of the at least two detectors is implemented as a reference detector for receiving photons representing zero distance. Thus, the at least two detectors may comprise the reference detector and the first to the fourth detector.

In a further development, the time-to-digital converter arrangement comprises a reference TD converter coupled to the reference detector. The reference TD converter may be coupled to the memory. The reference TD converter may generate a reference histogram. Alternatively, the reference detector may be coupled to the TD converter arrangement and provides a start signal to the TD converter arrangement. The start signal may be applied to the first to the fourth TD converter.

In an embodiment, the driver is configured to generate a series of pulses, each pulse having a duration equal or less than 1 ns, optionally less than 500 ps. Advantageously, the duration may be e.g. less than 200 ps.

In an embodiment, the driver is configured such that the duration of the pulse is programmable. The duration may be set such that the duration is less than the spatial resolution divided by the velocity of light.

In an embodiment, the semiconductor body comprises a communication unit, a clock unit and a charge pump coupled to the avalanche diodes of the at least two detectors. The communication unit is coupled to the evaluation unit and is configured to communicate data to an external device.

In a further development, the semiconductor body comprises at least one low-dropout regulator, abbreviated LDO. The LDO may be coupled to the TD converter arrangement.

In an embodiment, a time-of-flight sensor comprises the semiconductor body and a light source. Time-of-flight is abbreviated TOF.

In an embodiment, the light source is realized as a vertical-cavity surface-emitting laser, abbreviated VCSEL, or a vertical-external-cavity surface-emitting-laser, abbreviated VECSEL.

In an embodiment, the light source is realized by a further semiconductor body that is connected to the semiconductor body. The connection may be achieved by wire bonding, flip-chip technology or die-to-die bonding.

In an embodiment, the time-of-flight sensor comprises an optics. The optics may comprise a lens. Alternatively, the optics may be free of a lens. The optics, i.e. one or more lenses may be configured for imaging. For example, the optics is located at focal spots or a focal plane of the at least two detectors in order to create an image at the detectors. In some embodiments a single optics or a single lens can be used for creating an image at each detector.

In an embodiment, the time-of-flight sensor comprises a light blocking material. The light blocking material comprises an aperture or apertures. The light source emits light and the first to the fourth detector receive light through the aperture or the apertures. The optics may be located in the aperture or the apertures.

In an embodiment, the light blocking material forms a barrier between the reference detector and the first to the fourth detector. Thus, the first to the fourth detector do not directly receive light from the light source.

In an embodiment, a method for a time-of-flight measurement comprises:
  providing a driver signal to drive a light source,
  receiving photons by at least two detectors comprising at least one avalanche diode,
  converting the signals received by the at least two detectors by a time-to-digital converter arrangement into at least one histogram and storing the at least one histogram, and
  performing a calculation based on the at least one histogram by an evaluation unit.

In an embodiment, the result of the calculation may be a distance signal comprising an information about the sum of the distance from the light source to an object and the distance of the object to the at least two detectors. The distance signal may comprise an information about the sum of the distance from the light source to a further object and the distance of the further object to the at least two detectors. Thus, the distance signal may contain information about multiple objects, e.g. two, three or more than three objects.

In a further development, a first to a fourth detector receive photons. The first to the fourth detector receive photons from different regions, such as a first to a fourth region. The result of the calculation may be a first distance signal comprising information about a sum of the distance from the light source to an object in a first region and the distance of the object in the first region to the first detector. Correspondingly, the result of the calculation may be a second to a fourth distance signal comprising information about a sum of the distance from the light source to an object in the second to the fourth region and the distance of the object in the second to the fourth region to the second to the fourth detector.

The method for a time-of-flight measurement may be implemented for example by the semiconductor body and/or the time-of-flight sensor according to one of the embodiments defined above.

In an embodiment, the TOF sensor is realized as a time-of-flight system-on-chip. System-on-chip can be abbreviated SOC.

In an embodiment, the TOF sensor is implemented as a system on a chip which provide distance measurement components integrated into a single device. The TOF sensor optionally provides for direct TOF measurement. Advantageously, the TOF sensor provides a processing of information on-chip to produce measurement of distance and achieve a high accuracy.

In an embodiment, the light pulse width is narrow in the TOF sensor such that a return pulse time can accurately be measured using the TDC/histogram approach.

In an embodiment, the TOF sensor or TOF measurement system comprises the VCSEL and a single chip. All of the light pulse driver, reception and processing are provided on the single chip. The VCSEL generates the light pulse. The TOF measurement system is able to measure absolute distance or distances. The narrow light pulse coupled with the SPAD/TDC/histogram architecture enables multiple objects to be detected.

The apparatus and method provide a direct TOF distance measurement system-on-a-chip. The apparatus, also called TOF sensor, comprises multiple photon acquisition sensors, multiple time-to-digital converters (abbreviated TD converters), multiple histograms, memory, microprocessor, I/O circuit for communications and a light source driver to generate narrow pulses. The methods provide for processing the data to convert the histogram into distance to multiple objects.

Direct time-of-flight is based on measuring the time it takes for a pulse reflected from a target to reach the sensor. This technique can utilize multiple pulses over multiple periods to collect more data to improve the signal to noise distance. These periodic samples are collected into a histogram that is then processed to determine the distance. A very narrow pulse allows for the detection of multiple objects. The described method uses histograms to represent the distance to multiple objects, which can be seen as depth maps of objects visible within the field of view.

In an embodiment, the TOF sensor further includes a charge pump to provide the high voltage for the SPADs or SPAD arrays, low dropout regulators (abbreviated LDOs) used to provide power control in the TOF sensor, an oscillator to provide the clocking for the various blocks and a phase-locked-loop (abbreviated PLL) to provide high speed clocking. A typical TOF system or TOF sensor may consist of several discrete components. In the present disclosure, all parts (except the light source) are provided on a single chip. The TOF sensor implements a direct TOF technique. The histogram gained by the TOF sensor contains more information than only an average distance to all objects in the field of view (FOV). This is advantageous in many situation such as when the TOF sensor is placed behind cover glass which produces crosstalk, when the object is in front of a large wall, when there are multiple objects in the FOV such as two people and many other situations.

Fields of applications of the system or the TOF sensor are sensors for mobile devices (proximity, autofocus assist) or industrial applications.

Autofocus assist can be performed by TOF sensors. The distance is used to quickly focus the camera. This is especially useful in low light environments, where there is no contrast for the camera imaging system to use to determine the distance.

The TOF sensor comprises the semiconductor body, a VCSEL and associated lens/apertures. The TOF sensor may be called module, optical sensor arrangement or system. The camera autofocus may be implemented in mobile phones. The mobile phone camera may be realized as a front side camera and/or a back side camera. The front side camera is used for taking selfies which requires a shorter detect distance. The back side camera typically requires longer distance measurements. This camera is generally referred to as Laser Detect Autofocus or LDAF.

Advantageously, the product such as the camera performs a multiple object detection. A specific benefit may be reducing or eliminating the need for factory calibration. Another benefit may be the ability to be immune or to compensate (without customer intervention) for the impact of contamination on the cover glass.

In an embodiment, a direct TOF system-on-a-chip apparatus comprises a driver to drive a light source which generates narrow pulses; multiple subsystems for receiving a multitude of reflected light pulses and convert them to histograms of arrival times; a microprocessor for control and to process the receive histogram data and translate it to distance; a circuit for communicating data to external devices; clock and controls systems; a low-dropout regulator, abbreviated LDO, for power management; and a charge pump to provide high voltage for the SPADs.

In an embodiment, the driver generates narrow pulses for the light source. The driver comprises an eye safety verification circuitry. The driver is configured to generate pulses with programmable pulse widths.

In an embodiment, each subsystem receives a multitude of reflected light pulses and converts them to the histogram. Each subsystems comprises a SPAD receiver subsystem, a TD converter subsystem and a histogram memory storage subsystem.

In an embodiment, the SPAD receiver subsystem comprises a quenching circuitry, multiple SPADs with each SPAD capable of being enabled/disabled, a pulse generation circuit and a circuit to transmit the pulse to the TD converter subsystem.

In an embodiment, the TD converter subsystem comprises a ring oscillator and counter; a circuit to capture the current state of the ring oscillator and counter; a circuit to decode the captured state into a time stamp and a circuit to transfer the data to a histogram subsystem.

In an embodiment, the histogram memory storage subsystem comprises a circuit to use the timestamp to index a memory location, a circuit to read, increment and save data into that memory location and a circuit to allow reading and writing of histogram data by a microprocessor subsystem.

In an embodiment, the microprocessor subsystem comprises a circuit to read data from the histogram, a RAM for program and data storage, a ROM for program and fixed parameter storage, an evaluation unit or data processing unit for calculations and a circuit for data interchange with other on-chip systems.

In an embodiment, the I/O circuit comprises an I2C data receiver and data transmitter system, an interrupt mechanism and a general purpose I/O pin driver.

In an embodiment, the clock and control system comprises an oscillator to generate an internal base clock, a PLL to generate the high speed clock from the oscillator, voltage/current references and a power-on reset circuit to control startup sequencing and power glitches.

In an embodiment, the multiple sensors comprise four signal receiver sensors. The four sensors are arranged in a square. Alternatively, the four sensors are arranged in stipes or stripes or a stripe.

In an embodiment, one of the multiple sensor is a reference channel. The reference channel is separated from the four receiver sensors. The reference channel deliberately receives a portion of the transmitted signal representing zero distance.

In an embodiment, in the system, the program code is downloaded via the I/O circuit and stored in the RAM. Alternatively, the program code is stored in the ROM.

In an embodiment, a specific system design is realized such that the histogram memory is 256 entries deep, the microprocessor RAM is 32 k Bytes, the microprocessor ROM is 32 k Bytes, the microprocessor is a Cortex M0 processor, there are 128 SPADs, wherein two banks of SPADs share a single TD converter. This is only an example of a possible system.

In an embodiment, a method for processing the data from the histogram to extract distance data comprises the steps:
  steps to calibrate the system to determine the difference in timing between the different receive sensors,
  steps to process the reference channel to determine the start of the pulse,
  steps to adjust the multiple histogram channels to adjust the timing of each channel to a common time,
  steps to process the histogram and determine the position of one or multiple object in the histogram and
  steps to communicate the data to the external system.

In an embodiment, the steps to calibrate the system perform a calibration to an internal clock or to an external crystal clock.

In an embodiment, the steps to adjust the multiple histogram channels to adjust the timing of each channel to a common time are implemented such that the size of the histogram bins are as fine a possible or the size of the histogram bins are as coarse a possible approaching the width of the light pulse.

In an embodiment, the steps to process the histogram and determine the position of one or multiple object in the histogram comprises at least one of the steps that
  a single object is detected,
  multiple objects are detected,
  characteristics of the objects are reported and
  a fixed object are rejected or subtracted (such as cover glass).

In an embodiment, steps to communicate the data to the external system are realized such that a communication unit or interface circuit is interrupt driven or polled or timed.

In an embodiment, a method for controlling the system comprises at least one of the steps
  steps for initializing the system upon power-up,
  steps for starting an acquisition,
  steps for setting the timing of an acquisition,
  steps for determining the length of an acquisition,
  steps for periodically repeating an acquisition and
  steps for enabling/disabling any combination of SPADs.

The following description of figures of embodiments may further illustrate and explain aspects of the semiconductor body, the time-of-flight sensor and the method for a time-of-flight measurement. Devices and circuit parts with the same structure and the same effect, respectively, appear with equivalent reference symbols. In so far as devices or circuit parts correspond to one another in terms of their function in different figures, the description thereof is not repeated for each of the following figures.

DETAILED DESCRIPTION

Figure 1A:
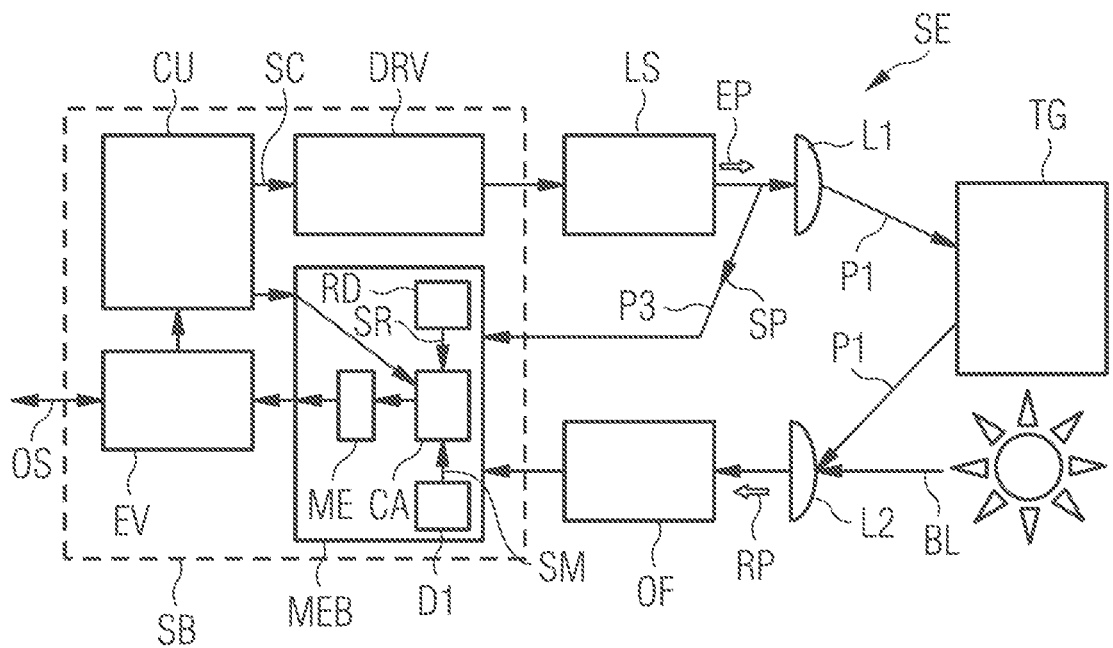
FIGS. 1A and 1B show an example implementation of a time-of-flight sensor.

FIG. 1A shows an example implementation of a time-of-flight sensor SE, abbreviated TOF sensor. The TOF sensor SE comprises a light source LS. The light source LS can be named optical emitter. The light source LS is a laser diode such as a VCSEL or VECSEL. These types of lasers may be configured to emit light in the infrared part of the electromagnetic spectrum, for example.

The TOF sensor SE comprises a semiconductor body SB coupled to the light source LS. The semiconductor body SB can also be named semiconductor die or chip or monolithically integrated circuit. The semiconductor body SB is implemented as a single detector die, e.g. as a single semiconductor integrated circuit manufactured by a CMOS process. The semiconductor body SB comprises a measurement block MEB and an evaluation unit EV. The evaluation unit EV can be implemented as a processing circuit or a data processing circuit. The evaluation unit EV is coupled to the measurement block MEB. The evaluation unit EV is configured to input data from an external circuit and to output data to the external circuit.

Moreover, the semiconductor body SB comprises a driver DRV having an output coupled to the light source LS.

Additionally, the semiconductor body SB comprises a control unit CU coupled to the driver DRV, the measurement block MEB and the evaluation unit EV. The control unit CU provides a control signal SC to the driver DRV to drive the light source LS. Alternatively, the control unit CU and the evaluation unit EV may be combined in a circuit such as a microprocessor, microcontroller or state machine.

The semiconductor body SB comprises at least two detectors, namely a first detector D1 and a reference detector RD. Each detector RD, D1 comprises at least one avalanche diode. Each detector RD, D1 may comprise an avalanche diode or an avalanche diode array. The avalanche diode or avalanche diodes are realized as single photon avalanche diodes, abbreviated SPAD.

The semiconductor body SB comprises a time-to-digital converter arrangement CA, abbreviated TD converter arrangement. An output of the first detector D1 is coupled to the TD converter arrangement CA. Also an output of the reference detector RD is coupled to the TD converter arrangement CA. The semiconductor body SB further comprises a memory ME that is coupled to the TD converter arrangement CA and the evaluation unit EV. The memory ME may be realized as histogram memory.

Thus, the measurement block MEB comprises the first detector D1, the reference detector RD, the TD converter arrangement CA and the memory ME.

Signal processing and time-of-flight calculation are performed on the same semiconductor body SB that comprises the first detector D1 and the reference detector RD. The components are integrated together into an integrated circuit IC made on the same semiconductor body SB that comprises the first detector D1 and the reference detector RD.

The first detector D1 and the reference detector RD are integrated into the semiconductor body SB. The first detector D1 and the reference detector RD are optically and spatially separated. The detectors D1, RD can be implemented as single SPADs or SPAD arrays. The reference detector RD is configured for a measurement of an optical reference signal and generates an electrical reference signal SR. The first detector D1 is configured for a measurement of an optical measurement signal and generates an electrical measurement signal SM.

The TOF sensor SE comprises a first and a second optics L1, L2. The first optics L1 comprises a first lens. The second optics L2 comprises a second lens. The lenses have an optical lens shape such as spherical or cylindrical shape. The lenses may act as concave and/or convex lenses (or a combination thereof) and may focus emitted or reflected light on a target TG and/or the first detector D1. For example, the first lens and/or the second lens can be aligned with respect to the light source LS and/or detector D1, and further detectors, to create an image at the detector site.

Alternatively, the first lens and/or the second lens may be omitted. The TOF sensor SE may be free of the first optics L1. The TOF sensor SE may be free of the second optics L2.

In operation, the light source LS emits light having an emission wavelength or emission spectrum in the IR or UV/Vis. Advantageously, infrared emission is invisible to human sight. The emission of the light source LS typically is modulated, e.g. emission is pulsed or modulated by a continuous wave, such as a sinusoidal or square wave. For example, pulses may have a frequency in the kHz or MHz range. The actual modulation frequency depends on whether the TOF sensor SE is used for proximity or autofocus applications, for example, and determines a range of the time-of-flight.

The light source LS is located such that at least a fraction of emitted light leaves the TOF sensor SE via the first optics L1. In reality, the majority of emitted light may leave the TOF sensor SE via the first optics L1. This fraction of light (denoted measurement fraction) eventually gets, at least partially, reflected by an external object or target TG. The first detector D1 is located in the TOF sensor SE such that reflected light may enter the TOF sensor SE by way of the second optics L2 and, consequently, be detected by the first detector D1. The first detector D1 generates the measurement signal SM in response to the detected light. The optical path connecting the light source LS with the first detector D1 by way of the target TG establishes a measurement path P1 and the light traversing along the measurement path P1 forms a measurement beam of light. As indicated in FIG. 1A, the external target TG is located outside of the TOF sensor SE.

Optionally, the TOF sensor SE comprises an optical filter OF between the second optics L2 and the first detector D1. Background light BL may be directed to the TOF sensor SE. The optical filter OF is configured to absorb at least a part of possible background light BL. The optical filter OF may e.g. absorb most of the background light BL, and thus may act as an ambient light filter.

Furthermore, a reference path P3 is established and optically connects the light source LS with the reference detector RD without running via any external target. For example, the reference path P3 remains inside the TOF sensor SE. For time-of-flight measurements a reference fraction of light traverses along the reference path P3 and forms a reference beam of light. The light of the reference beam is at least partly detected by the reference detector RD which, in turn, generates the reference signal SR based on the detected light. The light of the reference beam is generated by internal reflection inside the TOF sensor SE.

The measurement signal SM is a measure of the time-of-flight characteristic of the measurement path P1, and can be translated into an information about a distance D between the TOF sensor SE and the target TG.

Typically, the light source LS constitutes an external component which is electrically connected but may not be integrated into the semiconductor body SB. In this example, the driver DRV is integrated into the semiconductor body SB and the light source LS is a VCSEL laser diode which is arranged on a not-shown carrier of the TOF sensor SE. The light source LS is inside a package of the TOF sensor SE.

The driver DRV drives the light source LS depending on the control signal SC. In turn, the light source LS emits a train of sensing pulses of electromagnetic radiation in response to respective trigger pulses of the control signal SC.

Typically, the light source LS emits one sending pulse for each trigger pulse in the control signal SC. The electromagnetic radiation has wavelength from the visible, IR or UV part of the spectrum.

The sending pulses are guided through the first optics L1 and traverse along the measurement path P1, denoted as emitted pulses EP hereinafter. The target TG emits reflected pulses RP as a response to the emitted pulses EP. Eventually, the reflected pulses RP are detected by the first detector D1. Through reflections inside the TOF sensor SE, a portion of the sending pulse may be coupled out and directed to the reference detector RD as a starting pulse SP, indicating optically a time instant of the emission of the sending pulse respectively the emitted pulse EP. Upon detection of the starting pulse SP, the reference detector RD provides a start signal ST to the TD converter arrangement CA for starting the measurement of a time period Td between emitting and receiving a pulse. Consequently, the first detector D1 provides a stop signal SO to the TD converter arrangement CA after detection of a received pulse. The TD converter arrangement CA determines a respective difference value representative of the time period Td between the sending pulse and the received pulse.

It should be apparent to the skilled reader that the usage of start and stop signals ST, SO is only one of several options possible for determining said time period Td. For example, a start could also be triggered by the respective trigger pulse of the control signal SC, for example.

The TD converter arrangement CA provides the previously determined difference values representative of the time period Td to the memory ME for accumulating the values into a first histogram. The evaluation unit EV is configured to generate an output signal OS being indicative of the time-of-flight based on an evaluation of the first histogram. The control unit CU is configured to generate the control signal SC with a sequence of trigger pulses. This sequence of trigger pulses comprises a first trigger pulse and a plurality of subsequent trigger pulses.

The integration of the components into a single semiconductor body SB realizes a system-on-a-chip, shorted SOC, and makes the implementation of a time-of-flight system much simpler and cheaper than using various components on different semiconductor bodies. Advantageously, the TOF sensor SE implements a high degree of integration together with a depth-map based implementation.

As shown in FIG. 1A, the TOF sensor SE comprises the light source LS, which could be a VCSEL, the first detector D1 (also called photonic sensor), optional optics L1, L2 to focus the light onto the target TG and/or focus light received from the target TG onto the first detector D1, and the filter OF to limit the light received to the same bandwidth as the light transmitted. In FIG. 1A, a block diagram of the TOF sensor SE, that may be called system, module or optical sensor arrangement, is shown. The TOF sensor SE is configured to accomplish time-of-flight measurements, abbreviated TOF measurements. One example of such a TOF sensor SE could be a SPAD based system/arrangement/module coupled with a TD converter and histogram memory.

Figure 1B:
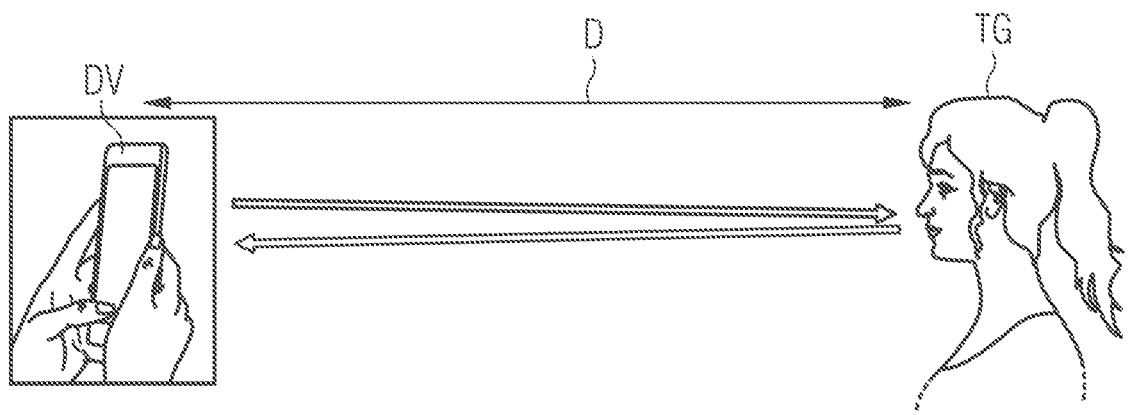

FIG. 1B shows an example of the arrangement shown in FIG. 1A. A device of mobile communication DV comprises the TOF sensor SE. The target TG of the TOF measurement may be e.g. a person. The light performs a pulse round trip. The method of time-of-fight (TOF) measurements is to measure how long it takes for radiation to travel over the distance D. Once the time period Td is measured, the distance D can be easily deduced by knowing the speed c of light. The following equation can be used:

$$D = Td \cdot c/2,$$

wherein D is the distance between the target TG and the TOF sensor SE, Td is the measured time period and c is the velocity of light (approximately 0.3 m/nsec). The evaluation unit EV determines the measured time period Td using the histogram. The histogram implements a depth map.

Figure 2:
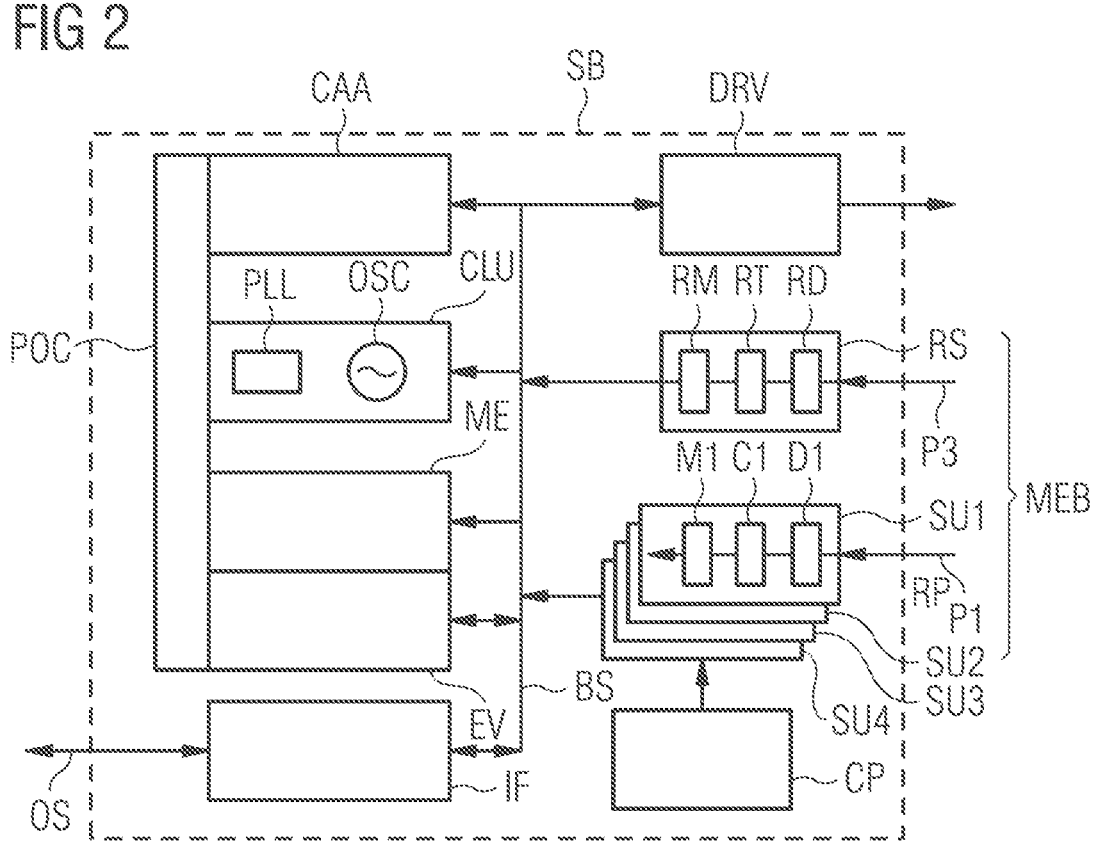
FIG. 2 shows an example implementation of a semiconductor body of a time-of-flight sensor.

FIG. 2 shows an example of the semiconductor body SB that is a further development of the above shown semiconductor body. The semiconductor body SB comprises a reference subsystem RS. The reference subsystem RS comprises the reference detector RD having at least one avalanche diode. The reference subsystem RS may comprise a reference time-to-digital controller RC, abbreviated reference TD converter. The reference subsystem RS may comprise a reference memory RM that may be called reference histogram memory.

Furthermore, the semiconductor body SB comprises at least one subsystem that comprises a detector, a TD converter and a memory. The detector comprises at least one avalanche diode. A first subsystem SU1 of the semiconductor body SB comprises the first detector D1, a first TD converter C1 and a first memory M1. The first memory M1 may be called first histogram memory. The first memory M1 may be part of the memory ME. For example, the semiconductor body SB comprises a second subsystem SU2 having a second detector D2, a second TD converter C2 and a second memory M2 that may be called second histogram memory. Additionally, the semiconductor body SB comprises a third and a fourth subsystem SU3, SU4 having a third and a fourth detector D3, D4, a third and a fourth TD converter C3, C4 and a third and a fourth memory M3, M4 that may be called histogram memory.

The TD converter arrangement CA comprises the first to the fourth TD converter C1 to C4. The TD converter arrangement CA may comprise the reference TD converter RC. The memory ME may comprise the first to the fourth memory M1 to M4.

Additionally, the semiconductor body SB comprises a charge pump CP that is coupled on its output side to the reference subsystem RS and the first to the fourth subsystem SU1 to SU4. The semiconductor body SB comprises the evaluation unit EV. Furthermore, the semiconductor body SB comprises a memory ME. The evaluation unit EV may be realized as a microprocessor, microcontroller or state machine. Moreover, the evaluation unit EV may comprise the memory ME. The memory ME may be realized as a random access memory, shorted RAM and/or a read only memory, abbreviated ROM and/or an electrically erasable read only memory, abbreviated EEPROM. Additionally, the semiconductor body SB comprises a clock unit CLU. The clock unit CLU comprises an oscillator OSC and/or a phase locked loop PLL.

The control unit CU shown in FIG. 1A is implemented using an analog circuit CAA comprising at least one low dropout regulator and/or a reference circuit such as a reference voltage circuit. The analog circuit CAA is connected to the driver DRV.

Additionally, the semiconductor body SB comprises a communication unit IF. The communication unit IF may be realized as an interface, e.g. as an I/O circuit, an I2C-interface or as an I2C general purpose interface (I2C GPIO). Furthermore, the semiconductor body SB comprises a power on reset circuit POC. The semiconductor body SB may comprise a bus system BS coupling the blocks, units and circuits DRV, CA, CLU, PLL, OSC, EV, IF, RS and SU1 to SU4 to each other.

The avalanche diode of the reference detector RD receives the optical reference signal. The reference subsystem RS provides data which are stored in the form of a reference histogram. The reference histogram is stored in the reference memory RM. The reference memory RM is separated from the memory ME.

In an alternative embodiment, not shown, the reference memory RM for storing the reference histogram may be an area of the memory ME.

The avalanche diodes of the first to the fourth detector D1 to D4 receive the optical measurement signal.

Correspondingly, the TD converter C1 to C4 of the first to the fourth subsystem SU1 to SU4 provide data that are stored in a first to a fourth histogram. The first to the fourth histogram are stored in the first to the fourth memory M1 to M4. The first to the fourth memory M1 to M4 are separated from the memory ME.

In an alternative embodiment, not shown, the first to the fourth memory M1 to M4 may be implemented by the memory ME. The evaluation unit EV provides the first to the fourth histogram and the reference histogram to the memory ME.

As shown in FIG. 2, the semiconductor body SB comprises several components. For simplicity of reference, three components will be referred to as an S-T-H subsystem or block. The S-T-H subsystem includes the single photon avalanche photodiode (SPAD) which detects the external reflected light, the TD converter which captures the arrival time of each photon and the histogram which records the arrival time of each photon. Other components include the driver DRV used to drive the VCSEL narrow pulses, the charge pump CP configured to provide the high voltage for the SPAD arrays, the low dropout regulators (shorted LDOs) used to provide power control in the device, the oscillator OSC to provide the clocking for the various blocks, the phase-locked-loop (PLL) to provide high speed clocking, the evaluation unit EV that may be implemented as a microprocessor with associated RAM and ROM and the communication unit IF to provide communication to external components.

Figure 7:
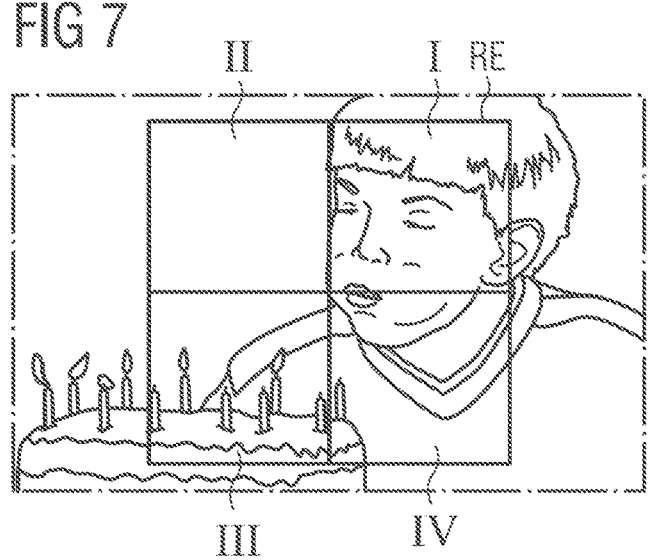
FIG. 7 shows an example of an image with four regions.

Several of the S-T-H subsystems can be implemented to provide multiple zones. This can provide detection of photons from four different regions of an image such as shown in FIG. 7. In addition, the reference S-T-H subsystem RS can be provided adjacent to the VCSEL output to record the exact time at which the VCSEL pulse has started. This in turn can be used to compensate for VCSEL pulse variation with temperature or degradation over time.

The implementation of multiple SPAD/TDC/histogram subsystems SU1 to SU4 along with the programmable microprocessor system allows for the configuration and adaptation of the TOF sensor SE to different application.

The described method uses histograms to represent the distance to multiple objects TG, which can be seen as depth maps of objects visible within the field of view. The TOF sensor SE may be accurate in measuring distances in various conditions where multiple objects TG are present. One such example is in a system having a cover-glass, wherein the cover-glass can be exposed to environmental contaminants.

Figure 3:
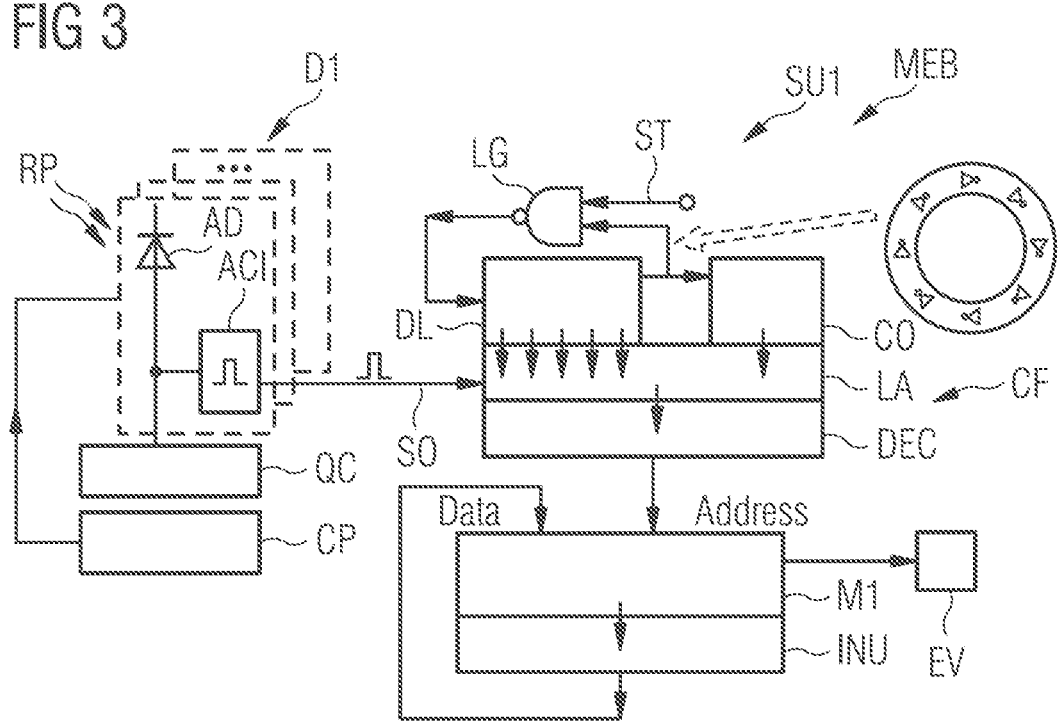
FIG. 3 shows details of an example implementation of a semiconductor body of a time-of-flight sensor.

FIG. 3 shows details of the semiconductor body SB which is a further development of the above shown examples. The first detector D1 comprises a quenching circuitry QC that is connected to an avalanche diode AD. The charge pump CP is coupled to the avalanche diode AD. The first TD converter C1 comprises a delay line DL and a logic gate LG that couples an output of the delay line DL to an input of the delay line DL. The delay line DL comprises a plurality of inverting elements that are connected in series. The start signal ST is provided to a further input of the logic gate LG. For example, the logic gate LG may be implemented as a NAND gate. Thus, the combination of the delay line DL and the logic gate LG realizes a ring oscillator. The ring oscillator is indicated by the ring at the right side of FIG. 3. The output of the delay line DL is connected to a counter CO of the first TD converter C1. Thus, the last inverting element of the series of inverting elements may be connected to the counter CO. Further outputs of the delay line DL and outputs of the counter CO are connected to inputs of a latch LA of the first TD converter C1. The latch LA may be realized as a storage element. An output of the avalanche diode AD is coupled via a pulse generator ACI to a trigger input of the latch LA. The ring oscillator comprises the delay line DL and the logic gate LG.

Moreover, the first TD converter C1 comprises a decoder DEC that is connected on its input side to the latch LA. The decoder DEC is coupled to the first memory M1 that means the memory area storing the first histogram corresponding to the first detector D1 of the first subsystem SU1. The first memory M1 is connected to an incrementing unit INU that couples an output of the first memory M1 to the input of the first memory M1. The latch LA, the decoder DEC and the incrementing unit INU are parts of a transfer circuit CF.

The start signal ST is provided to the logic gate LG. After the start signal ST the ring oscillator operates until the avalanche diode AD is triggered by a photon. The photon is part of the light received from the optical filter OF. The avalanche diode AD generates via the pulse generator ACI the stop signal SO that is provided to the trigger input of the latch LA. The status of the delay line DL and a counter value of the counter CO is stored in the latch LA at the time of the arrival of the stop signal SO. Thus, the logical states provided by the plurality of inverting elements and the counter value are stored in the latch LA. Information stored in the latch LA is decoded such that an address is provided to the first memory M1. The data stored in the first memory M1 at the address decoded by the decoder DEC is incremented by one and stored again in the first memory M1. An output of the first memory M1 is connected to the evaluation unit EV for data processing.

As shown in FIG. 3, the first SPAD subsystem SU1 comprises two key elements: the quenching circuitry QC to allow quick recovery after a photon is detected and the pulse generator ACI to provide a square pulse to the first TD converter C1. The first TD converter C1 comprises a ring oscillator with an enable signal followed by the latch LA and the counter CO which are decoded to provide the arrival time of each photon. The first histogram is realized in the first memory M1, where the arrival time is the address and the data is the number of times a photon has arrived during a predetermined measurement time that may be e.g. a very small but specific time.

Several avalanche diodes AD can be connected to a single TD converter. Each of these avalanche diodes AD can be enabled/disabled to allow for adjustment in sensitivity depending on the distance D to the target TA. Thus, the first detector D1 may comprise an avalanche diode array. The output signals of the avalanche diodes of such an array are combined to generate the stop signal SO. The combination may be realized by an OR combination.

Other detectors such as the second to the fourth detector D2 to D4 and, optionally also the reference detector RD, may be realized such as the first detector D1 shown in FIG. 3.

For example, other TD converters such as the second to the fourth TD converter C2 to C4 and, optionally also the reference converter RC, may be realized such as the first TD converter C1 shown in FIG. 3.

Figure 4:
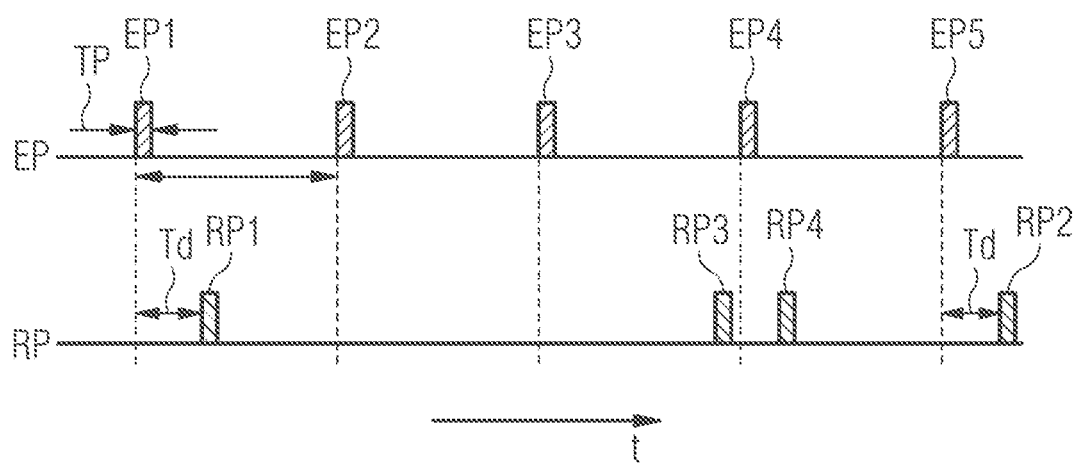
FIG. 4 shows a schematic example of a measurement process of a single object.

FIG. 4 shows a schematic example of a measurement process of a single object TG. In FIG. 4, the timing of the TOF sensor SE is shown. The timing diagram shows the emitted pulses EP also named outgoing light pulses in the upper line and the reflected pulses RP in the lower line as a function of a time t. In FIG. 4, a series of five emitted pulses EP1 to EP5 with an repetition rate, associated reflected pulses RP1 and RP2 reflected from the object TG, and additional reflected pulses RP3, RP4 originating from photons of noise or background light BL are shown. Furthermore, it is apparent that not all intervals may receive a photon resulting in a pulse.

Figure 5:
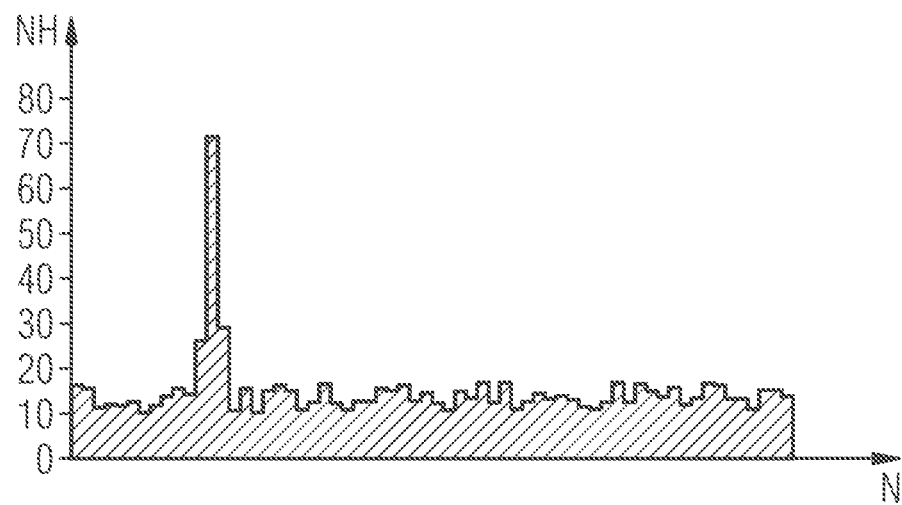
FIG. 5 shows a schematic histogram of a measurement process of a single object.

FIG. 5 shows a schematic histogram as generated by a measurement process of a single object or target TG. In the TOF sensor SE, the VCSEL pulses are repeated many times, e.g. possible several million pulses. The arrival time of each photon received is then measured and stored in the histogram.

The histogram records the background photons and the reflected photons from the target or object TG. The situation in the example shown in FIG. 1B may produce a histogram that may look like the histogram of FIG. 5. In the histogram, the number NH of photons as a function of the bin number N is shown. A bin can also be named bucket.

In this example, the pulse width TP may be 500 ps representing a distance of ~75 mm or ~3 inches. The histogram has 64 bins representing a maximum distance of ~4.8 m. The object is located at ~1 m. The background noise (ambient light or sunlight) may appear as a constant background level.

Figure 6A:
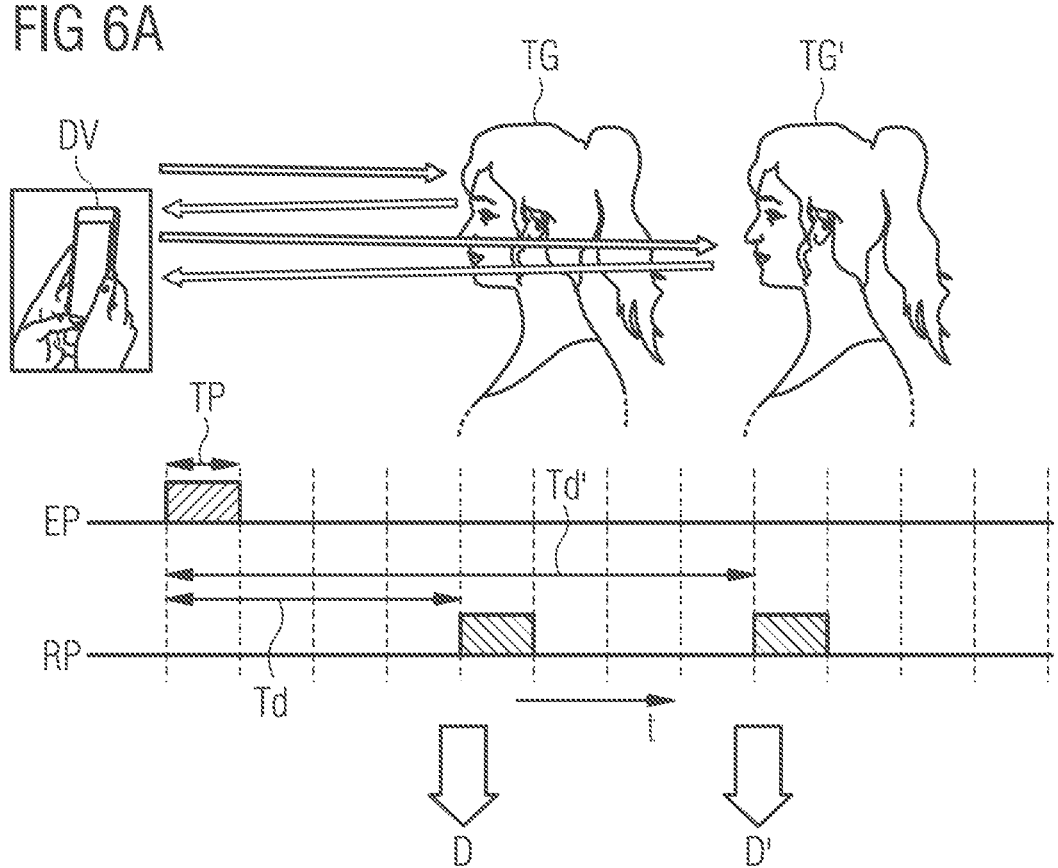
FIG. 6A shows a schematic example of a measurement process of two objects.

FIG. 6A shows a schematic example of a measurement process of two objects or targets TG, TG'. Direct time-of-flight is based on measuring the time it takes for a pulse reflected from the target TA to reach the TOF sensor SE. This technique can utilize multiple pulses over multiple periods to collect more data to improve the signal to noise ratio. These periodic samples are collected into the histogram and are then processed to determine the distance D. A very narrow pulse allows for the detection of multiple objects TG, TG'. In the example illustrated by FIG. 6A, the emitted pulse EP may have a duration TP of 500 ps and two time periods Td, Td' are measured resulting in two distances D, D'.

Figure 6B:
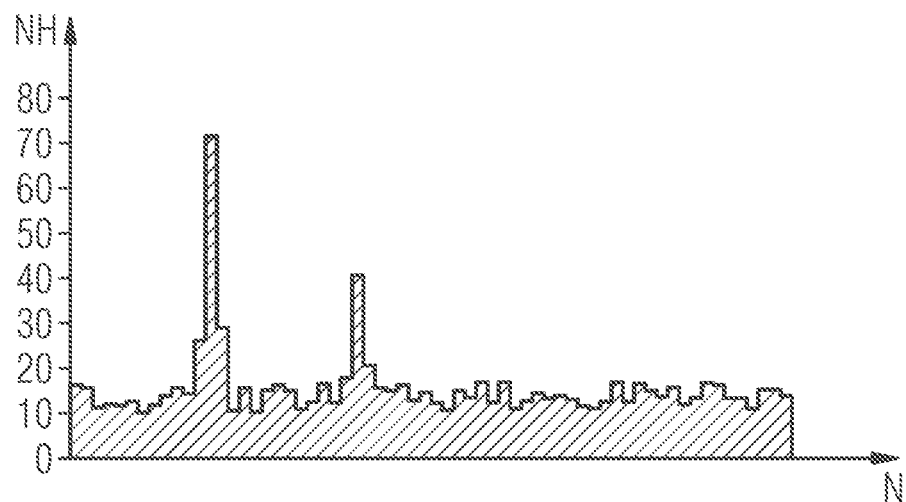
FIG. 6B shows a schematic histogram of a measurement process of two objects.

FIG. 6B shows a schematic histogram of the measurement process of two objects shown in FIG. 6A. As illustrated in FIG. 6B, the TOF sensor SE has the ability to detect multiple objects TG, TG' as long as the objects TG, TG' are separated by some distance.

FIG. 7 shows an example of an image with four regions. The image comprises a rectangle RE that is subdivided into four quadrants I, II, III, IV as superimposed on the image. The first detector D1 of the first submodule SU1 receives photons from the first quadrant I. Correspondingly, the second to the fourth detector D2 to D4 of the second to the fourth subsystem SU2 to SU4 receive photons from the second to the fourth quadrants II, III, IV. Thus, the first to the fourth subsystem SU1 to SU4 provide an information about objects that can be found in the first to the fourth quadrant I, II, III, IV of the image. The multiple SPAD/TDC/histogram can be organized in a variety of ways. One way is a square orientation. This could be used to focus the scene into an image and divide the image into multiple quadrants.

Figure 8A:
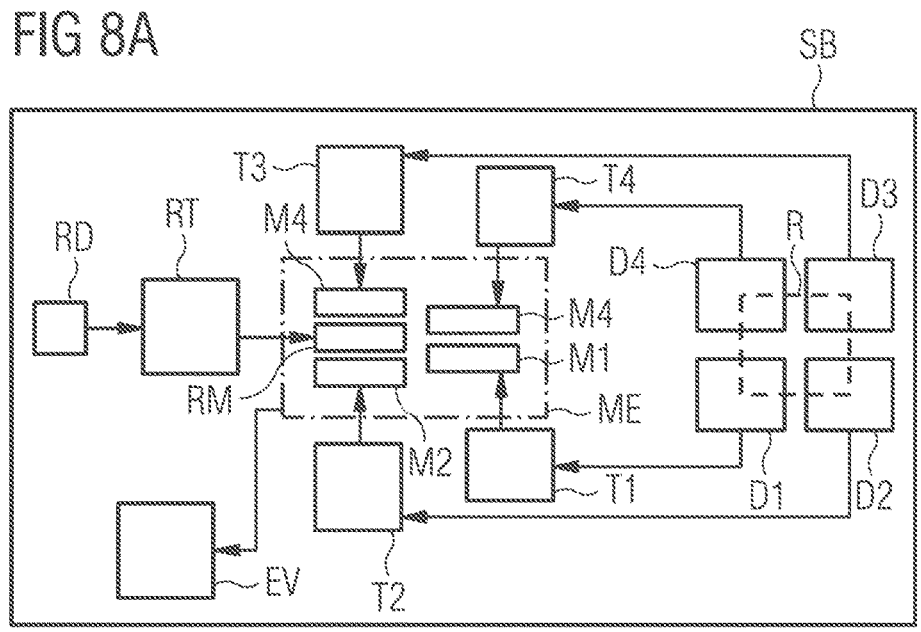
FIG. 8A shows an example implementation of a semiconductor body of a time-of-flight sensor.

FIG. 8A shows an example of the semiconductor body SB which is a further development of the above shown embodiments. The first to the fourth detector D1 to D4 of the first to the fourth subsystem SU1 to SU4 are realized in a regular manner, for example in an array. The array may be a two-by-two array. The first to the fourth detector D1 to D4 may be located on the four corners of a rectangle R or a square. The first to the fourth detector D1 to D4 are connected to the first to the fourth TD converter C1 to C4 which are connected to the first to the fourth memory M1 to M4 for storing the first to the fourth histogram. The reference detector RD is connected to the reference TD converter RC which is connected to the reference memory RM for storing the reference histogram. The first to the fourth detector D1 to D4 are configured to detect photons from the four quadrants shown in FIG. 7. The memory ME may comprise the first to the fourth memory M1 to M4 and the reference memory RM.

Alternatively, the semiconductor body SB comprises further detectors. The detectors may form other arrays than a two-by-two array such as e.g. a three-by-three array or a four-by-four array or larger or further arrays.

Additionally but not shown, the semiconductor body SB comprises the driver DRV, the evaluation unit EV and further units and circuits as shown in FIG. 1A or 2. FIG. 8A shows a top view of the semiconductor body SB.

The first to the fourth detector D1 to D4 and the reference detector RD comprises an avalanche diode or more than one avalanche diode. If a detector comprises more than one avalanche diode, the avalanche diodes of said detector may be arranged in a regular manner such as an array.

In an alternative, not shown embodiment, the first to the fourth detector D1 to D4 are arranged on a straight line. Thus, the TOF sensor SE determines four histograms generated by four regions that are arranged on a straight line in the image.

Figure 8B:
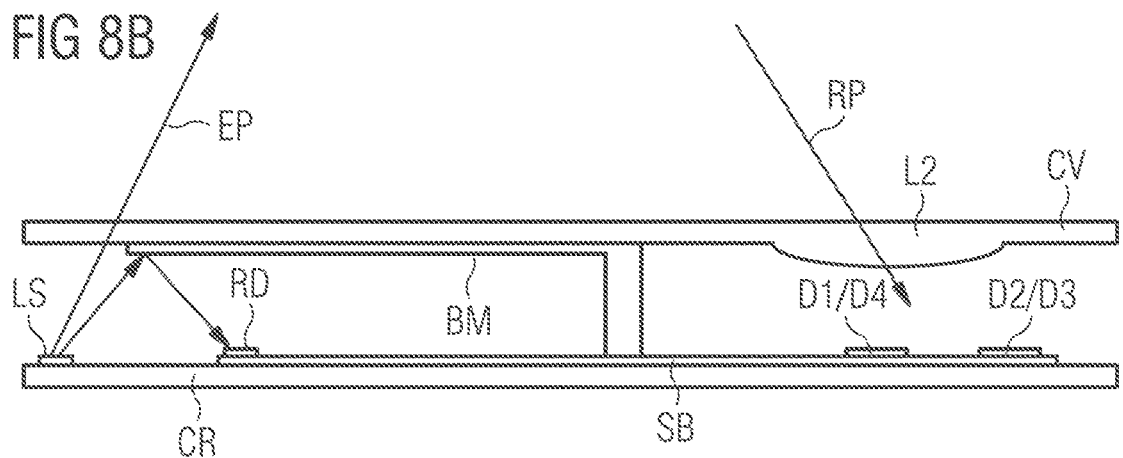
FIG. 8B shows an example implementation of a time-of-flight sensor.

FIG. 8B shows an example implementation of the TOF sensor SE which is a further development of the above shown examples. In FIG. 8B, a cross-section of the TOF sensor SE comprising the semiconductor body SB and the light source LS is shown. The semiconductor body SB and the light source LS are arranged on a carrier CR. The light source LS is realized as a VCSEL. The light source LS generates light that is reflected back from an internal surface of the TOF sensor SE and is received by the reference detector RD of the reference subsystem RS. Additionally, light is emitted via a cover CV and can be received by the not shown object TA. The light emitted by the object TA can be received via the second optics L2 comprising a lens in the cover CV by the first to the fourth detector D1 to D4 of the first to the fourth subsystem. The first to the fourth detector D1 to D4 receive light from different quadrants by the second optics L1. For example, the optics can be used to create an image at the four detectors D1 to D4, e.g. by aligning the detectors at the focal plane of the optics. In other words, the detectors are located behind an optics, a set of lenses or a single lens with imaging function.

The TOF sensor SE comprises a light blocking material BM. The light blocking material BM comprises an aperture. The light source LS emits light through the aperture. The first optics L1 and/or the light blocking material BM may form the aperture.

The light blocking material BM comprises a further aperture. The first to the fourth detector D1 to D4 receive light through the further aperture. The first optics L1 and/or the light blocking material BM may form the further aperture.

The light blocking material BM forms a barrier between the reference detector RD and the first to the fourth detector D1 to D4. Thus, the first to the fourth detector D1 to D4 do not directly receive light from the light source LS.

As shown e.g. in FIGS. 2 and 8A, the semiconductor body SB of the TOF sensor SE comprises four subsystems, namely the first to the fourth subsystem SU1 to SU4. Alternatively, the number of subsystems of the TOF sensor SE may be one, two, three or more than four. Thus, the TD converter arrangement CA comprises at least one TD converter, at least two TD converters, at least three TD converters or at least four TD converters.

As shown e.g. in FIGS. 2 and 8A, the semiconductor body SB of the TOF sensor SE comprises the reference subsystem RS having the reference detector RD and the reference TD converter RC.

Alternatively, as shown in FIG. 1A, the semiconductor body SB of the TOF sensor SE is free of the reference TD converter RC. The signal of the reference detector RD is used to generate the start signal ST of the first to the fourth TD converter C1 to C4. Thus, the reference TD converter RC and the reference memory RM shown in FIGS. 2 and 8A may be omitted.

In an alternative, not shown embodiment, the light source LS is directly attached on top of the semiconductor body SB.

The invention claimed is:

1. A semiconductor body for optical time-of-flight, comprising:
   a driver for driving a light source;
   at least two detectors each comprising at least one avalanche diode;
   a time-to-digital converter arrangement coupled to outputs of the at least two detectors;
   a memory that is coupled to the time-to-digital converter arrangement and is configured to store at least one histogram; and
   an evaluation unit coupled to the driver and to the memory,
   wherein the at least two detectors are implemented as a first to a fourth detector which are arranged in a square or a stripe and wherein the first to the fourth detector, the time-to-digital converter arrangement and the memory are configured to generate and store histograms of four different regions of an image, and wherein the semiconductor body is a single semiconductor die.

2. The semiconductor body for optical time-of-flight according to claim 1,
   wherein the time-to-digital converter arrangement comprises a first to a fourth time-to-digital converter coupled to the first to the fourth detector and to the memory.

3. The semiconductor body for optical time-of-flight according to claim 2,
   wherein at least one of the first to the fourth time-to-digital converter comprises
      a ring oscillator having an input coupled to the detector,
      a counter coupled to an output of the ring oscillator, and
      a transfer circuit configured to capture a current state of the ring oscillator and the counter, to decode the captured state into a time stamp and to transfer data into the memory as a function of the time stamp.

4. The semiconductor body for optical time-of-flight according to claim 1,
   wherein one of the at least two detectors is implemented as a reference detector for receiving photons representing zero distance.

5. The semiconductor body for optical time-of-flight according to claim 1,
   wherein the driver is configured to generate a series of pulses, each pulse having a duration equal or less than 1 ns.

6. The semiconductor body for optical time-of-flight according to claim 5,
   wherein the driver is configured such that the duration is programmable.

7. The semiconductor body for optical time-of-flight according to claim 1,
   comprising
      a clock unit,
      a charge pump that is coupled to the at least two detectors, and
      a communication unit that is coupled to the evaluation unit and is configured to communicate data to an external device.

8. A time-of-flight sensor, comprising the semiconductor body according to claim 1 and a light source.

9. The time-of-flight sensor according to claim 8,
   wherein the light source is realized as a vertical-cavity surface-emitting laser or a vertical-external-cavity surface-emitting-laser.

10. The time-of-flight sensor according to claim 8,
    wherein the light source is realized by a further semiconductor body that is connected to the semiconductor body.

11. The time-of-flight sensor according to claim 8,
    wherein the time-of-flight sensor comprises a light blocking material that comprises an aperture.

12. The time-of-flight sensor according to claim 11,
    wherein the light blocking material forms a barrier between a reference detector and the first to the fourth detector.

13. The semiconductor body for optical time-of-flight according to claim 1, further comprising:
    subsystems for each detector, wherein each subsystem comprises a detector, a time-to-digital converter and a memory, such that:
       a first subsystem of the semiconductor body comprises the first detector, a first time-to-digital converter and a first histogram memory;
       a second subsystem of the semiconductor body comprises the second detector, a second time-to-digital converter and a second histogram memory; and a third and a fourth subsystem of the semiconductor body comprising the third and fourth detector, a third and a fourth time-to-digital converter and a third and a fourth histogram memory.

14. A method for a time-of-flight measurement, comprising:

providing a driver signal to drive a light source;

receiving photons by at least two detectors each having at least one avalanche diode;

converting signals received by the at least two detectors by a time-to-digital converter arrangement into at least one histogram and storing the at least one histogram; and performing a calculation based on the at least one histogram by an evaluation unit, wherein the at least two detectors are implemented as a first to a fourth detector which are arranged in a square or a stripe and wherein the first to the fourth detector, the time-to-digital converter arrangement and a memory are configured to generate and store histograms of four different regions of an image, and wherein each of the histograms comprises information received by one respective detector.

15. A semiconductor body for optical time-of-flight, comprising:

a driver for driving a light source;

at least two detectors each comprising at least one avalanche diode;

a time-to-digital converter arrangement coupled to outputs of the at least two detectors;

a memory that is coupled to the time-to-digital converter arrangement and is configured to store at least one histogram; and an evaluation unit coupled to the driver and to the memory, wherein the at least two detectors are implemented as a first to a fourth detector which are arranged in a square or a stripe and wherein the first to the fourth detector, the time-to-digital converter arrangement and the memory are configured to generate and store histograms of four different regions of an image, and wherein each of the histograms comprises information received by one respective detector.

* * * * *